(12) United States Patent
Smolyanskaya et al.

(10) Patent No.: US 11,409,432 B2
(45) Date of Patent: Aug. 9, 2022

(54) PEN COMMAND FOR INK EDITING

(71) Applicant: MICROSOFT TECHNOLOGY LICENSING, LLC, Redmond, WA (US)

(72) Inventors: Irina Smolyanskaya, Seattle, WA (US); Julio Estrada, Santa Ynez, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/133,120

(22) Filed: Dec. 23, 2020

(65) Prior Publication Data

US 2022/0197495 A1 Jun. 23, 2022

(51) Int. Cl.
*G06F 3/048* (2013.01)
*G06F 3/04883* (2022.01)
*G06F 3/0482* (2013.01)
*G06F 3/04845* (2022.01)
*G06F 3/0354* (2013.01)

(52) U.S. Cl.
CPC ...... *G06F 3/04883* (2013.01); *G06F 3/03545* (2013.01); *G06F 3/0482* (2013.01); *G06F 3/04845* (2013.01)

(58) Field of Classification Search
CPC ...... G06F 3/03545; G06F 3/011; G06F 3/017; G06F 3/04883
See application file for complete search history.

(56) References Cited

U.S. PATENT DOCUMENTS

| 6,664,991 | B1 | 12/2003 | Chew et al. |
| 6,938,220 | B1 | 8/2005 | Shigematsu et al. |
| 9,250,766 | B2 | 2/2016 | Gil et al. |
| 9,746,995 | B2 | 8/2017 | Kotler et al. |
| 9,804,749 | B2 | 10/2017 | Shankar et al. |
| 10,429,954 | B2 | 10/2019 | Markiewicz et al. |
| 2005/0275638 | A1* | 12/2005 | Kolmykov-Zotov ........ G06F 3/04883 345/179 |
| 2006/0267966 | A1* | 11/2006 | Grossman ........ G06F 3/03545 345/179 |

(Continued)

FOREIGN PATENT DOCUMENTS

EP    1973063 A1    9/2008

OTHER PUBLICATIONS

Kristensson, et al., "Continuous Recognition and Visualization of Pen Strokes and Touch-Screen Privileged and Confidential 12 SK/NG/MC Gestures", In Proceedings of the Eighth Eurographics Symposium on Sketch-Based Interfaces and Modeling, Aug. 2011, pp. 95-102.

(Continued)

*Primary Examiner* — Claudia Dragoescu
(74) *Attorney, Agent, or Firm* — NovoTechIP International PLLC

(57) ABSTRACT

A system and method for invoking and executing a command using a digital pen are provided. The system is configured to receive a stroke from a digital pen, determine context of the stroke, detect a hold and press action from the digital pen, determine a type of the command based on the context of the stroke, responsive to detecting the hold and press action and determining the type of the command, invoke the command of the determined type, and execute the invoked command.

20 Claims, 13 Drawing Sheets

(56) References Cited

U.S. PATENT DOCUMENTS

| | | | |
|---|---|---|---|
| 2012/0324422 A1* | 12/2012 | Chartier | .................... G06F 8/33 |
| | | | 717/109 |
| 2015/0121183 A1 | 4/2015 | Mahoney et al. | |
| 2017/0153806 A1 | 6/2017 | Rucine et al. | |
| 2020/0356254 A1* | 11/2020 | Missig | ................ G06F 3/04886 |
| 2020/0356768 A1* | 11/2020 | Gregoire | .............. G06F 3/0481 |

OTHER PUBLICATIONS

Zhang, et al., "Sensing Posture-Aware Pen+Touch Interaction on Tablets", In Proceedings of the CHI Conference on Human Factors in Computing Systems, May 4, 2019, 14 Pages.

"International Search Report and Written Opinion Issued in PCT Application No. PCT/US21/060414", dated Feb. 25, 2022, 11 Pages.

* cited by examiner

PEN COMMAND FOR INK EDITING

TECHNICAL FIELD

The present disclosure is directed to systems and methods for inking and ink editing, and in particular to systems and methods for invoking a pen command for ink editing.

BACKGROUND

Digital inking allows handwriting and drawings to be added electronically to documents and be displayed on a computing device (e.g., a tablet). For example, people can use a digital pen to perform inking on personal digital journals for journaling (e.g., note-taking, lists, and photos), planning (e.g., calendaring, goal/habit tracking, to-dos), and content-creating (e.g., diagramming, mind mapping, and storytelling). Inking using a digital pen on a digital canvas becomes more and more useful due to its traditional text processing capacities and handwriting handling capacity. People also modify or edit what they place/ink on the screen using the digital pen, i.e., ink editing. For example, when people are journaling or inking, they may delete a word and replace the word with different phrasing, make space to insert additional details, or move the ink around to change the content layout. There are many examples indicating users frequently perform ink editing while working/inking on their ideas, and more accurately, users frequently switch between inking and ink editing through their work. Currently, inking applications (or apps) provide users with multiple tools to help with the ink editing process, such as eraser, lasso, tools to insert/remove space, highlighter, etc. While these tools aid with ink editing, for a user that frequently switches between inking and editing ink, the user must identify a correct tool to perform a specific action. For example, in the middle of writing, a user may need to go to a menu, take a lasso tool, and select and move the ink for some space. Then, the user needs to go back to the menu and pick up a pen tool. With this pen tool and extra space, the user can continue writing. These tools often cause inconvenience in ink editing due to the travel to these tools and/or switch between these tools.

SUMMARY

In one aspect, a command invoking system for invoking and executing a command using a digital pen includes a processor, and a memory, coupled to the processor, configured to store executable instructions. The instructions, when executed by the processor, cause the processor to receive a stroke from the digital pen, determine context of the stroke, detect a hold and press action from the digital pen, determine a type of the command based on the context of the stroke, responsive to detecting the hold and press action and determining the type of the command, invoke the command of the determined type, and execute the invoked command In another aspect, a method for invoking and executing a command using a digital pen includes receiving a stroke from the digital pen, determining context of the stroke, detecting a hold and press action from the digital pen, determining a type of the command based on the context of the stroke, responsive to detecting the hold and press action and determining the type of the command, invoking the command of the determined type, and executing the invoked command.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
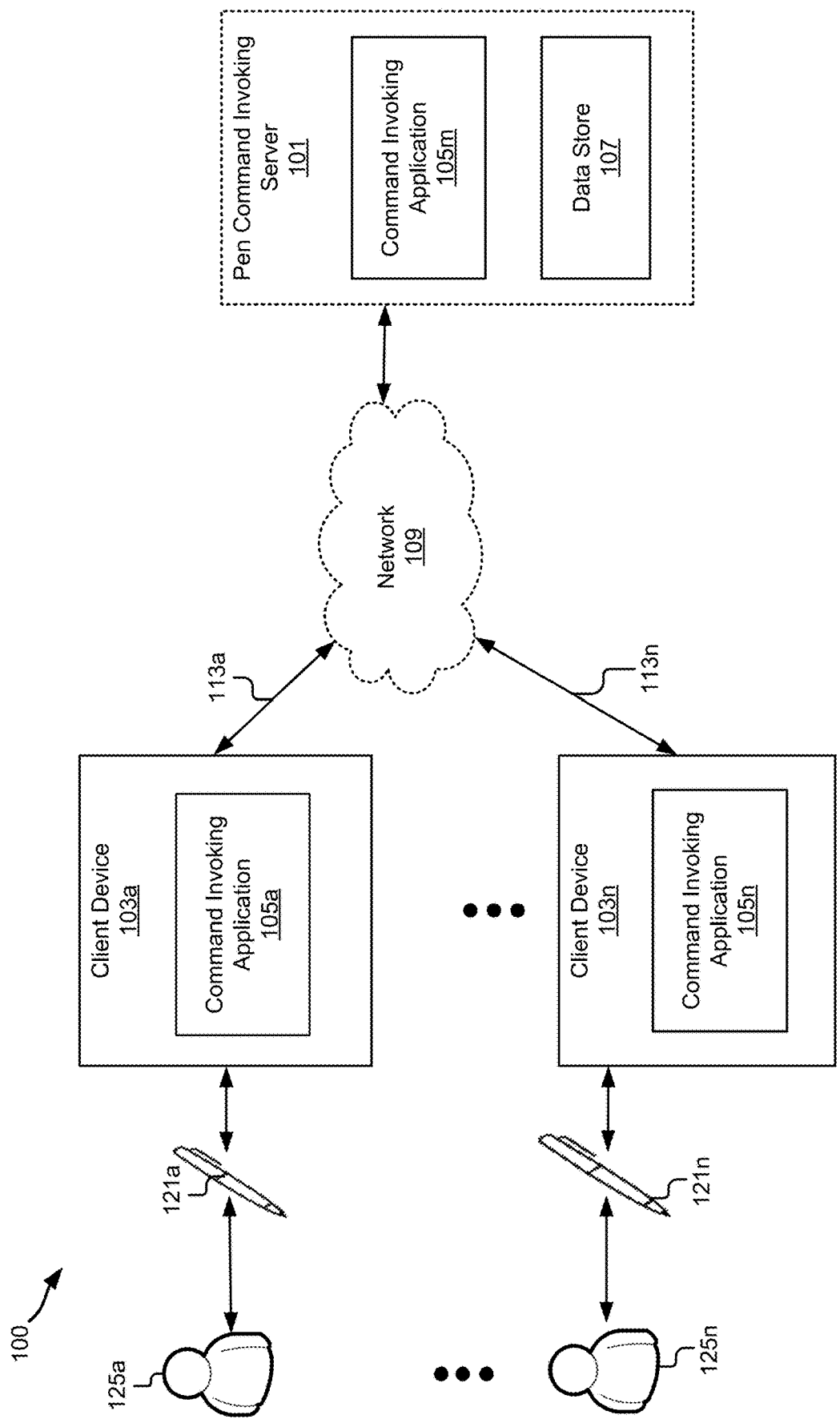
FIG. 1 is a block diagram of an example pen command invoking system.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure provides a technical solution for enabling users to directly manipulate content with their pen at the instant locations for ink editing, without requiring the users to access traditional application user interface (UI) elements, such as menus, buttons, and tools, some of which are generally statically located at the designated locations or areas in other existing inking applications. The technical solution described in the present disclosure addresses the technical problem of statically located menus, tools, or buttons by allowing users to invoke pen commands in the instant locations of inking or ink editing. These pen commands, once invoked, may allow users to directly edit the existing ink at the ink locations without requiring the users to travel to a conventional menu or tools shown in other existing inking applications. The technical solution provides a variety of commands corresponding to tools that are frequently used for ink editing, and thus allows users to complete many ink editing processes with just pen commands, thereby improving navigation speed and improving the efficiency of operating an electronic device.

In some implementations, the various pen commands provided by the technical solution may include a pen command for adding or removing space within certain words, content, or ink objects (may be referred to as "Space Command" hereinafter), a pen command for removing certain words, content, or ink objects (may be referred to as "Remove Command" hereinafter), a pen command for selecting certain words, content, or ink objects for further processing (may be referred to as "Select Command" hereinafter), a pen command for bringing out a menu at a desired location (may be referred to as "Menu Command" hereinafter), a pen command for adjusting the layout by reflowing existing words, content, or ink objects (may be referred to as "Reflow Command" hereinafter), a pen command for undo/redo of certain inking processes (may be referred to as "Undo/Redo Command" hereinafter). The pen commands listed here are for exemplary purposes and are not for limitation of the technical solution.

The technical solution allows a user to easily invoke a pen command through natural gestures without requiring much extra effort. For example, the technical solution may allow a user to bring out a menu at a desired location by just pressing and holding a digital pen at the desired location. Also, the technical solution may allow a user to invoke a space command by just drawing a small vertical line followed by a pressing and holding of a digital pen. The technical solution may further allow a user to select certain words, content, or ink objects by just circling the words, content, or ink objects, followed by a pressing and holding of a digital pen. Other pen commands may be also easily invoked through different gestures.

Since these pen commands are invoked locally or at desired locations through very natural gestures, the technical solution allows users to stay "in-the-flow" by keeping a focus on their content, minimizing distractions and inefficiencies associated with context switching between UI elements (like menus, tools, buttons in other existing inking applications) and content: number of steps, distance to travel from content to menu, pen position adjustments to press a pen button, use of the back of the pen eraser, etc. Given the high frequency of these inking processes, even small individual efficiencies, fewer context switches, and more natural gestures yield significant aggregate value. The technical effects, therefore, show an improvement in the functioning of computers, particularly those with a canvas for frequent inking, such as journaling, planning, etc.

FIG. 1 is a block diagram of an example pen command invoking system 100. As illustrated, the system 100 includes one or more client devices 103a . . . 103n and one or more pens 121a . . . 121n coupled to the client devices 103a . . . 103n. Optionally, the pen command invoking system 100 may further include a pen command invoking server 101 communicatively coupled to the one or more client devices 103a . . . 103n via a network 109. Each of the client devices 103a . . . 103n may further include a command invoking application 105n. Optionally, a command invoking application 105m may also be included in the pen command invoking server 101. It is to be noted that FIG. 1 is provided by way of example and the system 100 and/or further systems contemplated by the present disclosure may include additional and/or fewer components, may combine components and/or divide one or more of the components into additional components, etc. For example, the system 100 may include any number of pen command invoking servers 101, client devices 103a . . . 103n, or networks 109.

The network 109 may be a conventional type, wired and/or wireless, and may have numerous different configurations, including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In some implementations, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a . . . 103n (or collectively client device 103) may include virtual or physical computer processors, memor(ies), communication interface(s)/device(s), etc., which along with other components of the client device 103 are coupled to the network 109 via signal lines 113a . . . 113n for communication with other entities of the system 100. In some implementations, the client device 103a . . . 103n, accessed by users 125a . . . 125n via pens 121a . . . 121n respectively, may send and receive data to and from other client device(s) 103 and/or the pen command invoking server 101, and may further analyze and process the data. For example, the client devices 103a . . . 103n may communicate with the pen command invoking server 101 to transmit user data including user habits on pen operations to the pen command invoking server 101. The pen command invoking server 101 may analyze user habits to determine thresholds for defining a press and/or a hold operation by a user. The pen command invoking server 101 may further transmit the determined thresholds to the respective client device 103n associated with a user 125n. Non-limiting examples of client device 103 may include a laptop computer, a desktop computer, a tablet computer, a mobile telephone, a personal digital assistant (PDA), a mobile email device, or any other electronic devices capable of performing inking or ink editing.

In some implementations, the client devices 103a . . . 103n include instances 105a . . . 105n of a pen command invoking application 105. The pen command invoking application 105 may receive a stroke followed by a triggering action from a pen 121 touching a client device 103. The triggering action may automatically invoke a pen command on the client device 103. Once invoked, the pen command may allow a user to instantly edit inking through the digital pen 121 without traveling to convention menus and tools in specific locations as other existing apps. The pen command invoking application 105 will be described in more detail below with reference to FIG. 2.

As depicted, the pen command invoking server 101 may also include an instance of the pen command invoking application 105m. Each instance 105a . . . 105n may include one or more components of the pen command invoking application 105 depicted in FIG. 2, and may be configured to fully or partially perform the functionalities described therein depending on where the instance resides. In some implementations, the pen command invoking server 101 may be a cloud server that possesses larger computing capabilities and computing resources than the client device 103*a*, and therefore may perform more complex computation than the client device 103*a* can. For example, the command invoking application 105 may perform a decision process to determine whether a user is implementing a pressing or a holding action. Depending on different user habits, user age, different pens used for pressing and/or holding, it may require setting different thresholds when determining whether a user is pressing or holding a pen. User data from different operations and/or different stages of a same operation may be transmitted from a user device 103 associated with a user 125 to the pen command invoking server 101. The pen command invoking server 101 may then identify threshold(s) to determine whether a pressing or holding is performed by that user. In some implementations, the user data may be stored in data store 107. In some implementations, a machine learning model may be further developed and/or deployed in the pen command invoking server 101, to allow determination whether a pressing and/or holding is being performed by a user.

Figure 2:
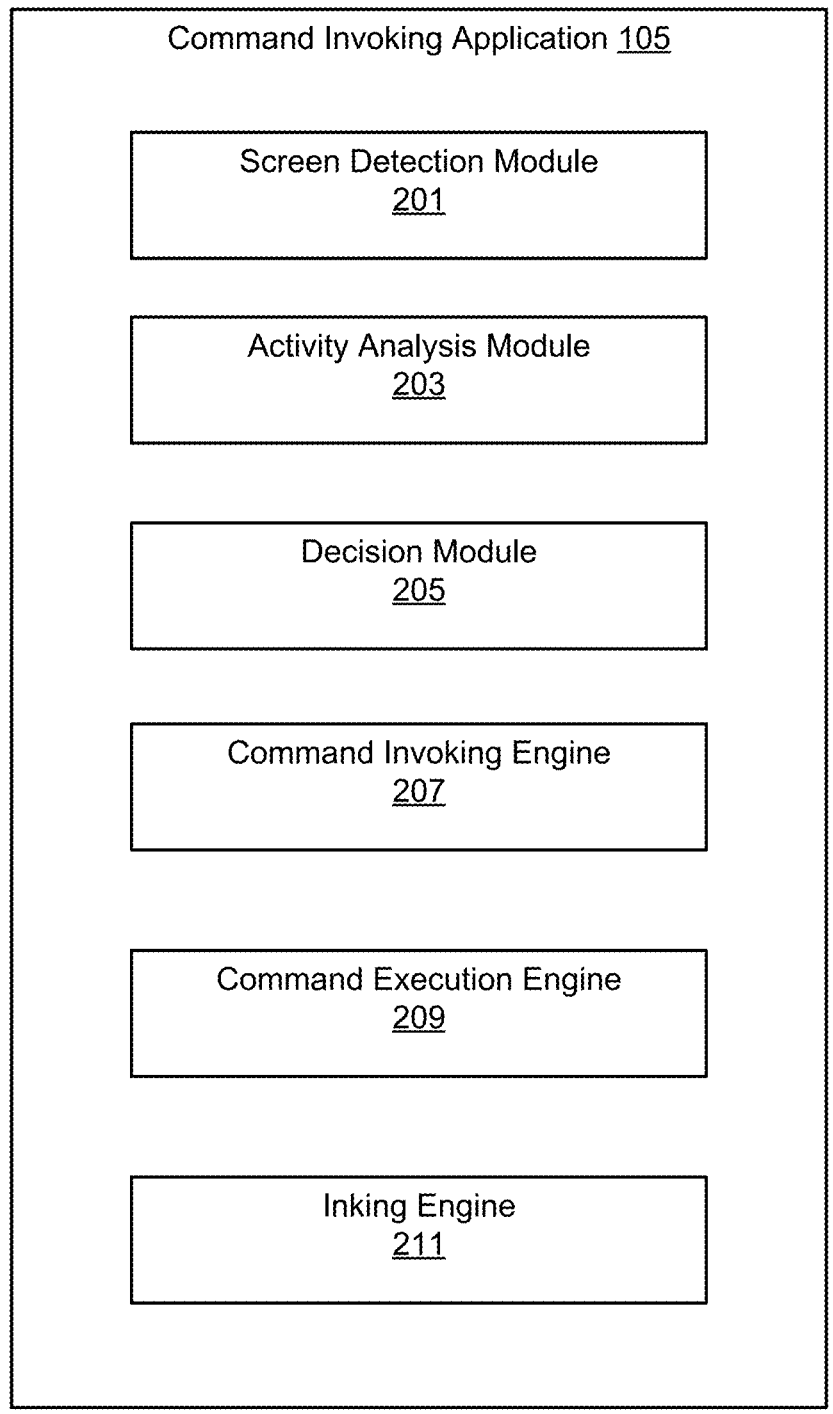
FIG. 2 is a block diagram of example components of a pen command invoking application.

FIG. 2 is a block diagram of example components of a pen command invoking application 105. As illustrated, the pen command invoking application 105 may include a screen detection module 201, an activity analysis module 203, a decision module 205, a command invoking engine 207, a command execution engine 209, and optionally an inking engine 211. The screen detection module 201 detects activities implemented on a touch screen, which may be a canvas for a digital pen. The activity analysis module 203 may analyze activities performed on the touch screen, for example, what, where, and how long a pen-related operation (may be also referred to as a gesture) is performed on the touch screen. The decision module 205 may decide whether to invoke a pen command based on the activity analysis. For example, the decision module 205 may determine that a pen command is triggered after the analysis indicates that a press and hold action is being applied to the touch screen by a digital pen. The command invoking engine 207 may invoke a pen command based on the decision made by the decision module 205. For example, if the decision module 205 has determined that a pen command is triggered, the command invoking engine 207 may invoke the pen command, to allow the pen to perform certain ink editing on the touch screen. The command execution engine 209 may execute certain command-related ink editing, thereby allowing the pen to manipulate the existing ink on the canvas. That is, once a pen command is invoked, the content on the touch screen may be further manipulated (e.g., by the command execution engine 209.) In some implementations, the pen command invoking application 105 may optionally include an inking engine 211 configured to perform general inking activities other than a pen command. For example, the inking engine 211 may perform a tap command, which may unselect objects or content previously selected, as further described in FIG. 3. In another example, the inking engine 211 may allow a user to continue inking without requiring a specific pen command. In some implementations, the pen command invoking application 105 may include other components not listed here.

The screen detection module 201 may be configured to detect pen strokes applied on the screen, as well as certain no-stroke pen activities. In some implementations, the screen detection module 201 may include a canvas event tracking component that tracks any activities applied on a screen or canvas by a digital pen. For example, the screen detection module 201 may detect that a user is moving digital content displayed on a screen. The screen detection module 201 may detect that the digital pen is touching one point of the screen and then drag the pen in one direction. In another example, the screen detection module 201 may detect a scroll bar is moving in another direction. In some implementations, the screen detection module 201 may detect that a user is pressing and holding a pen on a specific location of the screen.

In some implementations, the screen detection module 201 may include a location identification component to identify location(s) (e.g., most recent location) where a user had applied a stroke on the screen or canvas. For example, the location identification component may collect location information from a digitizer of the computer device, where the digitizer may use a capacitance technique to sense the location of a user's hand and/or the pen. Alternatively, and/or additionally, one or more cameras within the computing device can detect the position of the user's hand and/or the pen. The camera(s) can optionally include a depth camera system that uses a time-of-flight technique, a structured light technique, a stereoscopic technique, etc., to capture a depth image of the user's hand and/or the pen. Alternatively, and/or additionally, an inertial measurement unit (IMU) associated with the pen can detect the position of the pen, and, by extension, the position of the hand that holds the pen. The IMU can include any combination of one or more accelerometers, gyroscopes, magnetometers, etc. Still, other techniques for detecting the location of the user's hand and/or the pen can be used. From whatever techniques are applied, the location information of the digital pen and the performed gesture may be identified. In some implementations, the location information may be compared with the existing ink (i.e., contents such as texts, tables, charts, images, etc.) to determine where the strokes or gestures have been applied with respect to the content.

In some implementations, the screen detection module 201 may further include a pressure determination component to determine the pressure applied to the surface of the display device from a digital pen. In some implementations, the pressure determination component may communicate with the digital pen to collect the pressure information. For example, the digital pen may be an active-type pen that includes an electronic component for registering the pressure at which the user presses a pen tip against the surface of the display device at each moment. For example, a tip displacement sensor may register the force with which the user applies the pen against the surface of the digitizer in the canvas. The pen may also include a transmitter that forwards the pressure information to the computing device (e.g., to the pressure determination component in the screen detection module 201). In some implementations, the computer device may itself include a sensor that measures/calculates/determines how much pressure is being exerted on a touch screen. For example, zinc oxide (ZnO)-based thin-film transistor (TFT) sensors can be easily integrated with existing commercial integrated circuits (ICs) widely used to control touch screens and provide pressure information. In some implementations, the screen detection module 201 may detect other information during an inking or ink editing process.

The activity analysis module 203 may analyze activities of the digital pen applied to the screen. For example, upon detection of a pen activity, the location information with respect to the existing ink in the canvas, the pressure information, and other relevant information may be analyzed by the activity analysis module 203. In some implementations, the existing ink in a canvas may exist as a Document Object Model (DOM) structure, which may tell where the words are located, where the lines exist, where the circles are drawn, etc. Based on the information analysis, the intention of each pen activity may be identified.

For example, based on the pressure information, the activity analysis module 203 may determine that there is a press action taken by the user of a digital pen. The analysis may make this decision by comparing the pressure information with a predefined value or threshold used to determine whether a screen touch is considered as a press or a general tap. In some implementations, the predefined value or threshold may be a general value applied to all users and all devices. In some implementations, the predefined value or threshold may be user-specific, computing device-specific, and/or pen-specific. Accordingly, the activity analysis module 203 may further include a learning component that may be trained to understand what is considered as a press for a specific user with a specific computing device and/or a specific pen, and then determine the user-specific, computing device-specific, and/or pen-specific threshold for determining whether a gesture is considered as a press. For example, the learning component may detect multiple attempted presses with stronger and stronger pressure, and then determines that the first attempted press with the smallest pressure may be the threshold for that user in that computing device with that pen. In some implementations, the activity analysis module 203 may collect the MAC address to identify the computing device, based on the biometric information or other identification information to identify the user, and based on the pen identifier to identify the specific pen. For example, the transmitter of a pen may also transmit the pen identifier to the computing device when the pen is activated for the computing device.

In another example, based on the location information, the activity analysis module 203 may determine where a stroke is applied by a digital pen. For example, if a vertical line is drawn, the shape and location of the vertical line may be identified. Based on the identified location information, combined with the digital content location, the activity analysis module 203 may determine whether the vertical line is drawn between words, at the end of a line, at the beginning of a line, at the end of multiple lines, at the beginning of multiple lines, etc. For another example, if a circle, or a circle-like stroke is drawn, based on the location information of the circle or circle-like stroke, the activity analysis module 203 may determine what digital content is located within a circle. For example, the activity analysis module 203 may determine that a couple of words, an image, an equation, a table, etc., is located within the circle or circle-like stroke drawn by a digital pen.

The decision module 205 may decide whether to invoke a pen command based on the activity analysis, and what pen command is to be invoked if it is determined to invoke a pen commend. For example, based on the pressure information, the decision module 205 may determine that there is a hold action performed by a user of a digital pen. Further, by tracking how long the user has pressed the digital pen through analyzing the pressure informant in a short time span, the decision module 205 may further determine that the user has pressed and held the digital pen for a sufficient time, and thus determine that the user may have an intention to invoke a pen command. The decision module 205 may thus determine to invoke a pen command for the digital pen. In some implementations, the decision module 205 may determine that the user press and hold the digital pen for too long, and thus determine that the user may want to give up the current pen command. The decision module 205 may then determine not to invoke a pen command, or cancel the just invoked pen command.

In some implementations, when it is determined to invoke a pen command, the decision module 205 may further determine whether which pen command to invoke. At this point, the decision module 205 may check the context of the press and hold action applied to the screen. For example, the decision module 205 may check what stroke has been performed right before the detected press and hold and based on the stroke information to determine which kind of pen command is to be invoked. For example, the decision module 205 may use a shape recognizer to identify the specific shape of a stroke (e.g., a vertical line, a horizontal line, a circle, a drag, etc.). As one example, the decision module 205 may find that the preceding stroke is a vertical line drawn between two words, and then determine to invoke a Space Command, to allow the space to be added between these two words. In another example, the decision module 205 may find that the preceding stroke is a line drawn across a few words or a few sentences, and then determine to invoke a Remove Command, to allow the words or sentences that have been crossed to be removed. In yet another example, the decision module 205 may find that the preceding stroke is a circle or circle-like stroke drawn around certain words, image, table, etc., and then determine to invoke a Select Command, to allow the digital content inside the circle or circle-like stroke to be selected for further actions (e.g., recoloring, moving to a different location, etc.). In yet another example, the decision module 205 may find that the preceding stroke is a vertical line drawn on the right or left side of a line or a few lines, and then determine to invoke a Reflow Command, to allow the layout to be adjusted. In yet another example, the decision module 205 may find that the preceding stroke is a pure press and hold, and then determine to invoke a Menu Command, to allow a menu to appear around the location where the press and hold action is being performed. It is to be noted that the foregoing descriptions are merely for illustrative purposes, and the present disclosure is not limited to the pen commands described above and the ways how these pen commands are invoked.

The command invoking engine 207 may be configured to invoke a pen command according to the decision made by the decision module 205. By invoking a pen command, certain digital content may become interactive with the digital pen, and thus allow the digital pen to manipulate the relevant content without require going through certain tools or menus at the designated location of the screen or canvas. That is, once a pen command is invoked, the digital content related to the pen command may become active for local ink editing by the digital pen.

As one example, once a Space Command is invoked (e.g., right after a stroke of the vertical line was drawn between two words), the vertical line drawn by the digital pen before invoking the Space Command now becomes interactive with the digital pen. The vertical line may then be dragged by the digital pen to move right and/or left. When the vertical line is dragged by the digital pen to move right, the words on the right side of the vertical line also move, therefore adding space between the two words where the vertical line has been drawn.

In another example, once a Select Command is invoked, (e.g., right after a circle was drawn around certain digital content), the digital content in the circle now becomes interactive with the digital pen. For example, the digital content inside the circle may be then editable, may be movable to another location, or may be able to recolor to another color, etc.

In another example, once a Remove Command is invoked (e.g., right after a line was drawn across certain words or other digital content), crossed words may become interactive. In one exemplary implementation, these crossed words may be automatically removed without requiring further user manipulation. That is, the content removal may be automatically implemented once the Remove Command is invoked.

In yet another example, once a Menu Command is invoked (e.g., after a press and hold without a preceding stroke), a menu may be automatically pop-up on the screen in a location where the press and hold action is performed. Although the Menu Command does not activate certain digital content to make it interactive, the popped-up menu may provide certain functions that may be used to manipulate the interactive digital content. For example, the popped-up menu may include a row of selectable colors to allow a specific color to be selected and applied to certain digital content selected through the Select Command. Other than coloring, the popped-up menu may include a list of other tools for ink editing.

It is to be noted that, in some implementations, the popped-up menu may be contextual, providing a user with options that the user needs at the moment of the menu being popped-up. Accordingly, based on the context where the Menu Command is invoked, the popped-up menu may be customized for the current context, even if the menu is invoked in an empty space. For example, if the Menu Command is invoked at an empty space (i.e., a location where there is no ink or digital content), the popped-up menu may be a menu that is customized for inking, but not for ink editing, since there is no ink at the empty space. For another example, if the Menu Command is invoked at a location where a table stays, the popped-up menu may include more specific tools for table editing. For example, certain cell formatting tools may be included in the popped-up menu. However, if the Menu Command is invoked at a location with text, these cell formatting tools may be not included in the popped-up menu. Similarly, if the Menu Command is invoked around an image, certain image editing tools, such as crop, filter, brightness, contrast, etc., may be included in the menu instead.

The above-described instances of pen command invoking are provided for illustrative purposes. The present disclosure is not limited to these instances of pen command invoking. For example, there may be Reflow Command, Undo/Redo Command, etc., that may be also invoked by the pen command invoking engine 207, as will be described later in FIGS. 4A-4H.

The command execution engine 209 may be configured to execute certain ink editing related to an invoked pen command. In some implementations, once a pen command is invoked, different ink editing processes may be then executed through the invoked pen command. For example, once a Space Command is invoked, space may be added or removed between words through the Space Command. This may be reflected by a movable vertical line between two words. To add more space between the two words, the command execution engine 209 may monitor the stroke input from the user associated with the digital pen, and move the vertical line to the right based on the stroke input. In some implementations, the words on the right side of the vertical line may also be movable after the Space Command is invoked. In this way, the space between the two words may be then increased.

According to some implementations, once a Select Command is invoked, the selected content may become interactive, to allow further ink editing of the selected content. In one example, the command execution engine 209 may monitor the stroke input from the user associated with the digital pen and enable a movement of the selected content to move to a different location according to a user stroke input. In some implementations, if the user instead chooses to change the color of the digital content, the user may invoke a Menu Command to allow a corresponding menu to be popped-up around the selected content. In this way, the command execution engine 209 may further execute certain ink editing based on the tools selected from the menu by the user. For example, if a color is selected from the popped-up menu, the command execution engine 209 may apply the selected color to the selected digital content. For example, if a yellow color is selected for the digital content, the command execution engine 209 may apply the yellow color to the selected digital content.

According to some implementations, once a Remove Command is invoked, the command execution engine 209 may directly remove the digital content without requiring a user to further manipulate the digital content for removal. This may be different from other pen commands that require further user input to edit ink for the relevant digital content.

According to some implementations, once a Menu Command is invoked, the context-dependent menu may pup-up, which may be used for ink editing for specific digital content. It is to be noted that for Menu Command, since the menu can be popped-up at a location closer to the digital content to be applied, it still saves the traffic of using the menu when comparing with using the menu in the designated location of canvas and UI as many other ink applications do. In addition, since the popped-up menu is context-dependent and more specific to the to-be-applied digital content, it also saves time to go through the list(s) in the conventional menus to find the right tool(s) for ink editing.

According to some implementations, once a Reflow Command is invoked, the command execution engine 209 may reflow the relevant digital content during the ink editing to allow a user to easily create a desired layout of the relevant digital content. For example, if a line is drawn on the right side of any line(s) or any paragraph(s), and then a Reflow Command is invoked by pressing and holding the digital pen after the line is drawn, the command execution engine 209 may cause the digital content to be reflowable. That is, when the line is dragged to the left by the user, the words on the left side may be automatically reflowed. In this way, the digital content layout may be easily changed without repeatedly going through menus and tools in the designated location of canvas or screen. It is to be noted that the command execution engine 209 may take into consideration the height of the line and reflows only the content that the line affects in the aforementioned implementation.

It is to be noted that the Reflow Command-related ink editing is not limited to the foregoing exemplary layout adjustment, and many other layout adjustments may be also achieved through the Reflow Command-related or other pen commands-related ink editing. For example, when a user inserts words into a line or a paragraph, the command execution engine 209 may automatically create space for the words by moving the existing content around the target location. In another example, when a list item is moved from a list, the command execution engine 209 will automatically move up the following list items to fill the gap. If the removed item has been numbered, the command execution engine 209 will automatically re-number the remaining list items to make the whole list consistent after the item removal.

From the above, it can be seen that the Reflow Command provides some obvious advantages when compared to other existing layout adjustment tools or apps. For example, to adjust the layout, in existing tools or applications, the collected link needs to be converted to text first, then the reflow is performed on the converted text for layout adjustment. In other existing tools or applications, a user needs to first select a paragraph of ink, by creating a selection rectangle, and then drag and resize the selection rectangle to reflow the paragraph. All these existing tools and applications require extra user efforts, but not as convenient as the Reflow Command-based or other pen commands-based ink editing as described above.

It is to be noted the above-described pen command-related ink editing is merely for exemplary purposes. The command execution engine 209 may implement many other pen command-related ink editings, which will not be specifically listed here one-by-one.

In some implementations, besides the screen detection module 201, the activity analysis module 203, the decision module 205, the command invoking engine 207, and the command execution engine 209, the command invoking application 105 may include other components, modules, and/or engines that facilitate inking or ink editing. For example, the command invoking application 105 may include a general inking engine 211 that performs general ink editing without requiring to use pen commands described above. For example, the inking engine 211 may allow a few words to be crossed as a mark without removal of the crossed words if the Remove Command is not invoked. Other general ink editings, such as highlight, may also be performed by the inking engine 211, depending on the configurations of the canvas and the pen used for inking or ink editing.

Figure 3:
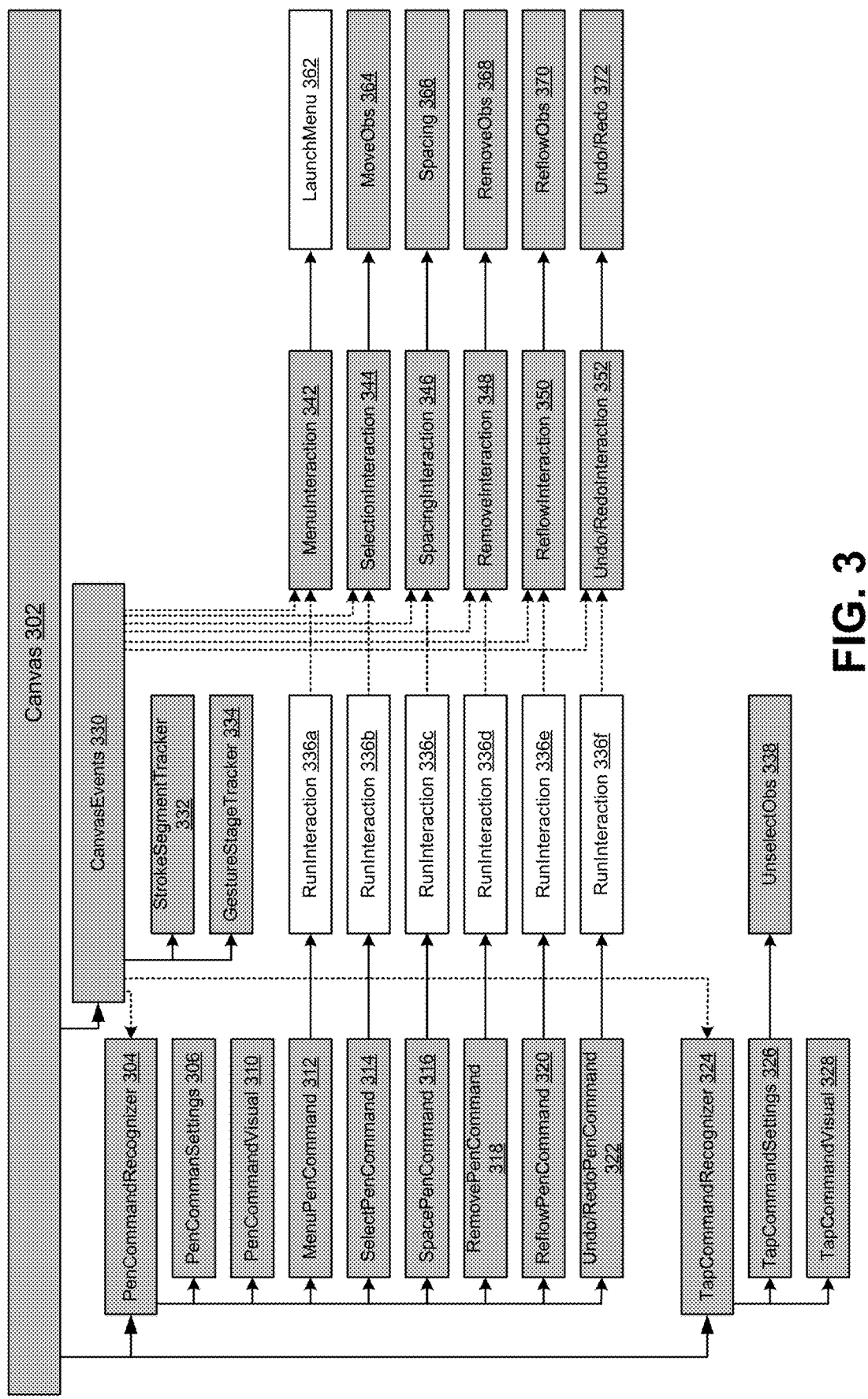
FIG. 3 is a block diagram of an example architecture of a canvas.

FIG. 3 illustrates an example architecture of a canvas for pen command implementation. As illustrated in the figure, the canvas 302 may include a plurality of objects/components that specify various pen command invoking and ink editing-related functions. For example, the canvas 302 may include a PenCommandRecognizer 304 that is configured to recognize a pen command. The PenCommandRecognizer 304 may further include a PenCommandSettings 306 to specify parameters that determine hold time and hold pressure used for defining a command trigger (i.e., a press and hold that invokes a pen command). The PenCommandRecognizer 304 may also include a PenCommandVisual 310 to specify a visual emphasize (e.g., a brief coloring, a brief highlighting, a flashing) for the stroke used to invoke a pen command and/or the location of the invoked pen command. The PenCommandRecognizer 304 may further include a MenuPenCommand 312 to specify details to recognize a Menu Command, a SelectPenCommand 314 to specify details to recognize a Select Command, a SpacePenCommand 316 to specify details to recognize a Space Command, a RemovePenCommand 318 to specify details to recognize a Remove Command, a ReflowPenCommand 320 to specify details to recognize a Reflow Command, and an Undo/RedoPenCommand 322 to specify details to recognize an Undo/Redo Command.

In some implementations, the canvas 302 may further include a CanvasEvents 330 for recording any event performed on the canvas 302. For example, the canvas 302 may include a StrokeSegmentTracker 332 that tracks strokes, including different segments of each stroke applied on the canvas 302. For example, the StrokeSegmentTracker 332 may track each segment of a circle or circle-like stroke to determine whether a Select Command should be invoked. Further, the canvas 302 may also include a GestureStageTracker 334 to track different stages of a gesture. A gesture may include not only a stroke, but also other actions performed by a user. For example, a gesture may include a stroke and a press and hold action (i.e., command trigger) right after the stroke. By tracking different stages of a gesture, the GestureStageTracker 334 may separate information for the stroke at an earlier stage from the press and hold information at a later stage of the gesture. In some implementations, the information recorded by the CanvasEvents 330 may be used by the PenCommandRecognizer 304 for comparison, to determine whether a pen command-invoking gesture is performed on the canvas 302.

In some implementations, the components/objects for specifying pen commands parameters and/or for recording canvas events, including the components 304, 306, 310, 312, 314, 316, 318, 320, 322, 330, 332, and 334 may be located inside, be part of, or cooperate with the screen detection module 201, activity analysis module 203, and/or the decision module 205 of the command invoking application 105, to detect various gestures that invoke pen commands.

It is to be noted that while the parameters that determine hold time (e.g., longer than a certain value) and hold/press pressure (e.g., larger than a certain value) are used for defining the command trigger in the PenCommandSettings 306, in some implementations, the speed of a stroke right before the command trigger may be also considered and used for the PenCommandSettings 306, to ensure that there is no false positive to occur when determining whether a pen command is invoked. For example, during an inking or ink editing process, the user may just pause a moment before performing a next inking. To ensure that there is no pen command invoked from this pause, the stroke speed right before the pause may be considered. If the speed right before the pause is low, it may indicate that there is no intention of the user to invoke a commend. However, if the speed right before the pause is high, it may mean that the user has a clear intention to pause at a certain location/time, which may thus indicate that the pause is intended for invoking a pen command. In some implementations, parameters other than the hold time, hold pressure, and the stroke speed right before the command trigger may be also considered by the PenCommandSettings 306.

In some implementations, the canvas 302 may also include other non-pen command-related inking or ink editing, and thus may also include other non-pen command related objects/components to specify non-pen command-related inking or ink editing. For example, the canvas 302 may include a TapCommandRecognizer 324 for recognizing a tap command. As illustrated, the TapCommandRecognizer 324 may further include a TapCommandSettings 326 that define certain parameters to recognize a tap command. Similar to the PenCommandRecognizer 304, the TapCommandRecognizer 324 may also include a TapCommandVisual 328 to specify a visual emphasize (e.g., a brief coloring, a brief highlighting, a flashing) for the tap used to invoke a tap command. In some implementations, when TapCommandSettings 326 are satisfied, objects selected through a Select Command may be unselected through UnselectObs 338. In some implementations, the TapCommandRecognizer 324, TapCommandSettings 326, TapCommandVisual 328, and UnselectObs 338 may be located inside, be part of, or cooperate with the inking engine 211 of the command invoking application 105, to detect various gestures that invoke tap commands.

In some implementations, the canvas 302 may allow certain RunInteractions 336a-3336f to be deployed once the corresponding pen commands are invoked (i.e., the parameters for invoking the respective pen commands are satisfied). For example, once the canvas event information for a gesture satisfies the parameters for MenuPenCommand 312, the MenuInteraction 342 is deployed. The MenuInteraction 342, when implemented on the canvas 302, may enable a LaunchMenu 362 to be executed on the canvas 302, thereby launching a menu on the canvas. Similarly, when the parameters for SelectPenCommand 314 are satisfied, the SelectInteraction 344 is deployed. The SelectInteraction 344, when implemented, may enable a Moveobs 362 to be executed on the canvas 302, to move the ink object(s) in the existing ink of the canvas 302. The SpacingInteraction 346, RemoveInteraction 348, ReflowInteraction 350, and Undo/RedoInteraction 352 may be also deployed, to implement a Spacing 336, RemoveObs 368, ReflowObs 370, and Undo/Redo 372 certain inking processes, respectively.

In some implementations, the components/objects for invoking and executing pen commands, including the components 342, 344, 346, 348, 350, 352, 362, 364, 366, 368, 370, and 372 may be located inside, be part of, or cooperate with the command invoking engine 207 and/or command execution engine 209 of the command invoking application 105, to invoke and execute pen commands.

In some implementations, the CanvasEvents 330 may also subscribe events happening in the PenCommandRecognizer 304, TapCommandRecognizer 324, MenuInteraction 342, SelectionInteraction 344, SpacingInteraction 346, RemoveInteraction 348, ReflowInteraction 350, and Undo/RedoInteraction 352, as indicated by the dotted arrows in FIG. 3. The subscriptions may allow the CanvasEvents 330 to record actions taken by these components/objects 304, 324, 342, 344, 346, 348, and 350.

It is to be noted the components/objects illustrated in FIG. 3 are merely for illustrative purposes. The canvas 302 may include fewer or more components and objects than those illustrated in FIG. 3. Once configured, a large variety of pen command-based inking or ink editing may be performed on the canvas 302, as described hereinafter in FIGS. 4A-4H.

Figure 4A:
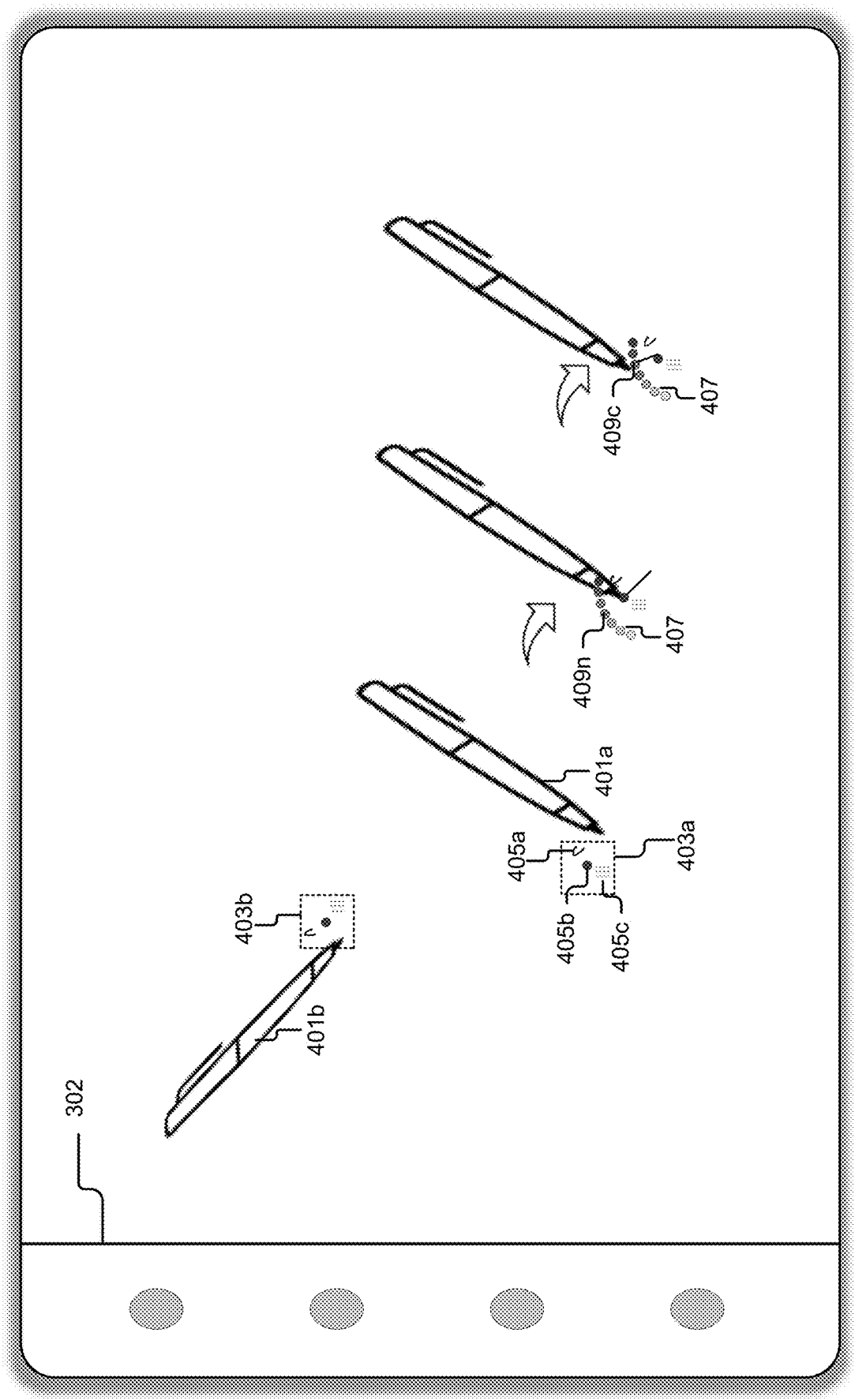
FIG. 4A illustrates example scenarios for invoking a Menu Command.

FIG. 4A illustrates example scenarios for invoking a Menu Command. To invoke a Menu Command on a canvas 302, a user may hold a pen 401a in any place on the canvas 302. For example, the user may invoke a Menu Command in an empty space by pressing and holding a pen 401a in the empty place. Once the Menu Command is invoked, a menu 403a pops-up. The popped-up menu 403a may include a list of tools 405a-405n, e.g., a tool 405a to select different strokes, a tool 405b to select different colors, etc. The user may intend to change the color for the text to be written in the next. Therefore, the user may push the pen 401a to the tool 405b for color selection. Once the color selection tool 405b is selected, the selectable color options 407 may pop-up right after. The selectable color options 407 may include a list of colors 409a-409n that are organized in a specific shape, e.g., in an arc shape as shown in FIG. 4A. To select a color from the color options 407, the user may then push the pen 401a to a specific color, e.g., a yellow color 409c. During the whole process, the user does not lift the pen 401a, but just moves the pen around the menu to complete the color selection. Once the color selection is completed and the user does not need an additional tool(s), the user may lift the pen, the selected color 409c will then be used in the next for the to-be-written text on the canvas 302.

In some implementations, the Menu Command may be optimized for both right-handed and left-handed users. For example, when a right-handed user presses and holds the digital pen 401a, a menu 403a may pop-up. On the other hand, when a left-handed user presses and holds a digital pen 401b, a different menu 403b may pop-up. The menu 403b may include a same list of tools as those included in the menu 403a, but these tools are arranged differently from the menu 403a, and are optimized for use by left-handed users for further selection of the tools in the menu 403b. For example, the menu 403b pops up on the right side of the digital pen 401b, but not on the left side of the digital pen 401a as shown for the menu 403a. In addition, the tools in the menu 403b are arranged in a reverse arc shape when compared to the arc shape for the menu 403a.

In some implementations, the Menu Command may be contextual, as previously described. That is, when a Menu Command is invoked, the invoked Menu Command may take into consideration the context to pop up a menu. The context may include the location where the command trigger occurs, the surrounding text, etc. For example, the tools in a menu popped-up in the empty space may be different from the tools in a menu popped-up over a word where the command trigger occurs.

Figure 4B:
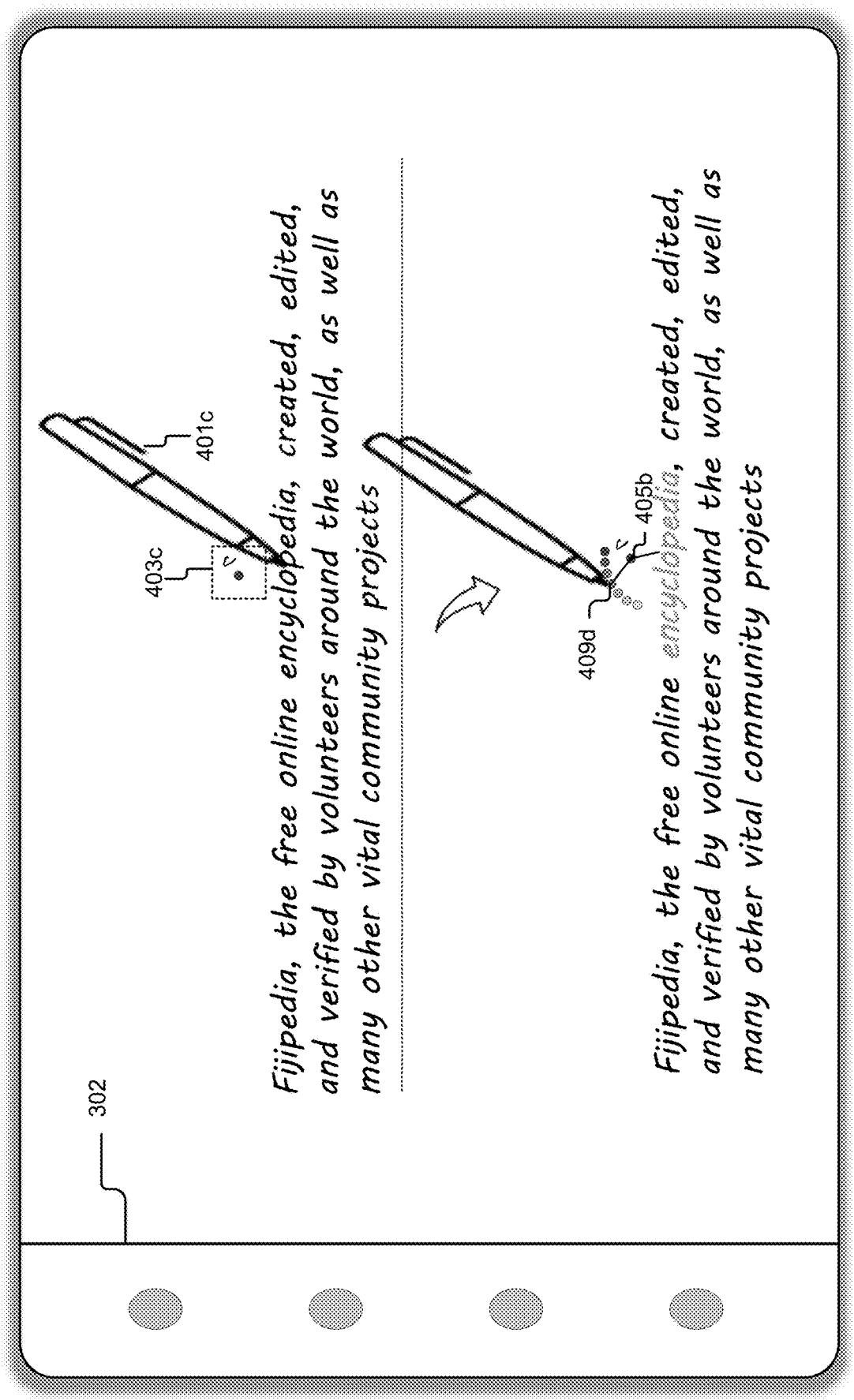
FIG. 4B illustrates an example scenario for contextually invoking a Menu Command.

FIG. 4B illustrates an example scenario for contextually invoking a Menu Command. As illustrated in the figure, a Menu Command may be invoked when a user touches a word "encyclopedia," and then press and hold the digital pen 401c. Compared to the menu 403a or 403b corresponding to a command trigger occurred at an empty space, the popped-up menu 403c here may include different tools that are more specific for ink editing of a word, but may not include tools that are not to be used for ink editing for a word. For example, the menu 403c may include only two tools but not three tools as shown in the menu 403a or 403b.

In the example scenario in FIG. 4B, the user may want to change the color for the word "encyclopedia." The user may first generate a command trigger by pressing and holding the pen 401c over the word "encyclopedia," to invoke the Menu Command. After command invoking, a menu 403c may pop up, which may include tools specific for ink editing of a word. The user may then select the color by moving the pen 401c first to the color selection tool 405b then to the specific color 409d. Once the specific color 409d is selected, the color of the word may automatically change to the selected color 409d. At this point, the user may lift the pen 401c to perform other inking or ink editing processes.

In some implementations, if a user wants to change the color for more than one word (e.g., if the user wants to change the words "the free online encyclopedia" in FIG. 4B), the user may need to invoke a Select Command first to select these words, and then invoke a Menu Command to change the color for these words. Accordingly, in some implementations, a user may sequentially invoke a series of pen commands to achieve a specific goal. During each command invoking and execution, the user may not lift a pen. However, between each of the series of pen commands, the user may lift the pen to invoke a next pen command.

Figure 4C:
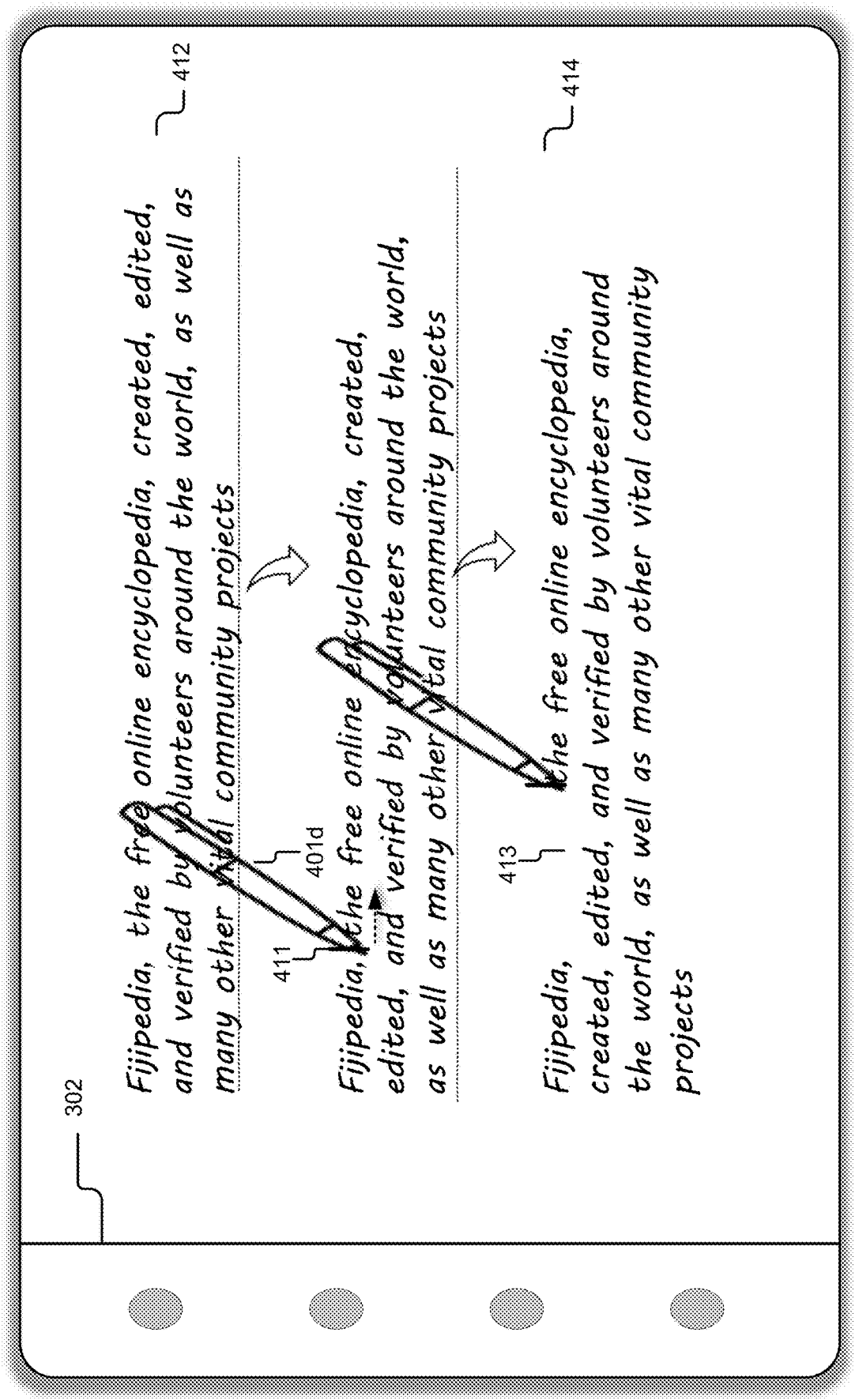
FIG. 4C illustrates an example scenario for invoking a Space Command.

FIG. 4C illustrates an example scenario for invoking a Space Command. In the figure, a canvas 302 may originally include one sentence, as illustrated in the top section 412 of the figure. A user managing the inking process of the canvas 302 may want to add a space between the words "Fijipedia" and "the" right after it. To add such a space, the user may first draw a vertical line 411 between the two words. Right after drawing the vertical line 411, the user may press and hold the pen 401*d* at the end of the drawing, which then invokes a Space Command. By invoking the Space Command, the vertical line 411 and the words on the right side of the vertical line 411 become movable if the pen is not lifted. Accordingly, to add a space, the user may just need to drag the vertical line 411 to the right side. All the words on the right side of the vertical line 411 then move along with the vertical line 411, to create a space 413 between the words "Fijipedia" and "the" right after it, as shown in the bottom section 414. It is to be noted that the Space Command may add space not only between two words in a sentence, but rather in many conditions. For one example, a vertical line may be drawn right at the beginning of a line, and thus space may be added right before a line. For another example, a vertical line may be drawn between numbers in a table, and thus space may be added between numbers in a table. Other examples for adding a space using the Space Command are also possible.

In some implementations, the Space Command may be also used to remove space. For example, in FIG. 4C, if "the free online encyclopedia" and the following comma in the sentence in the top section is removed through a Remove Command (e.g., a line is drawn across these words followed by the command trigger), a vertical line is then drawn right before the word "created" followed by the command trigger to invoke the Space Command. After invoking the Space Command, the vertical line may be then dragged left to the word "Fijipedia," to fill in the gap caused by the removal of the words "the free online encyclopedia" and the following comma.

Figure 4D:
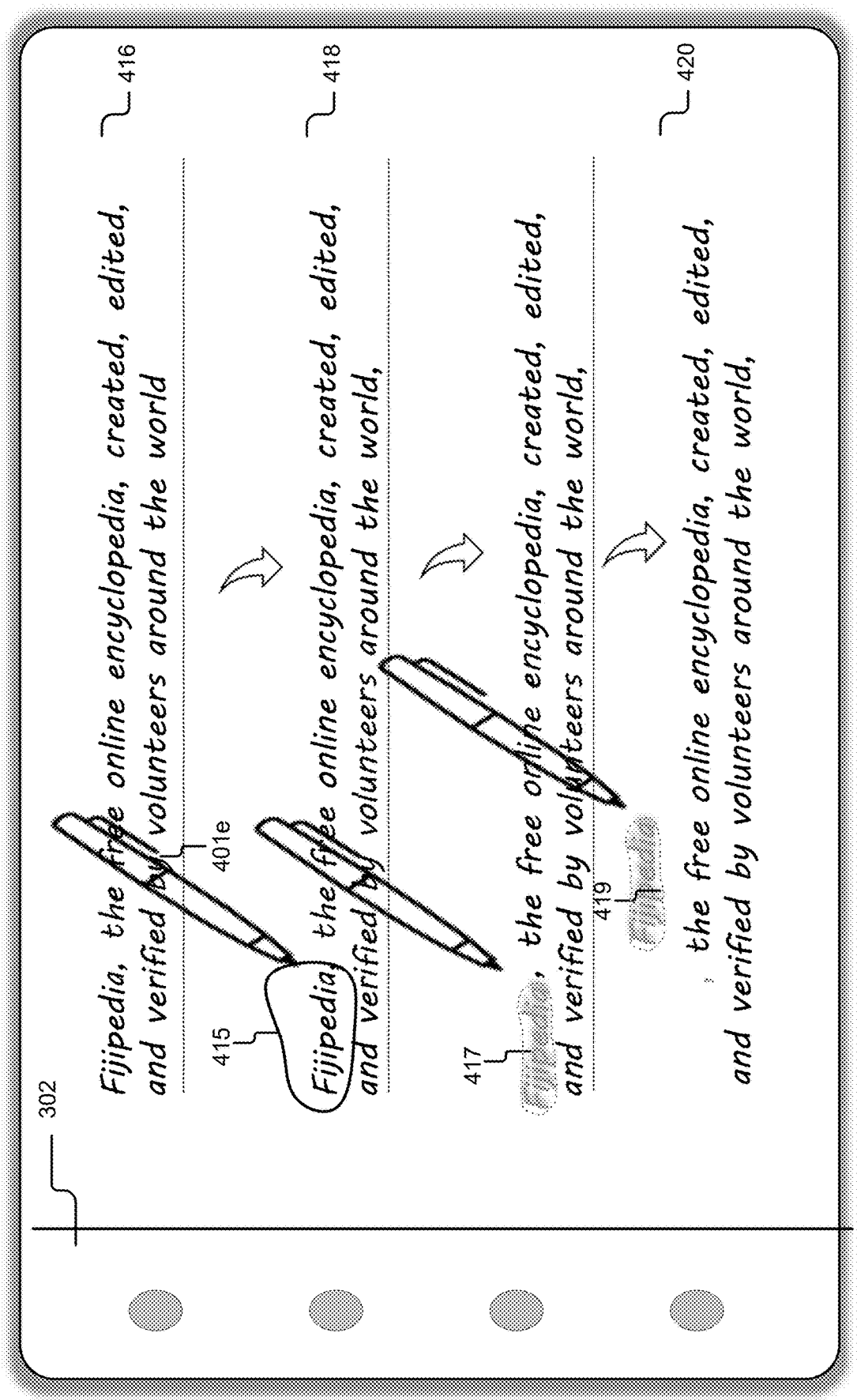
FIG. 4D illustrates an example scenario for invoking a Select Command.

FIG. 4D illustrates an example scenario for invoking a Select Command. In the figure, a canvas 302 may originally include one sentence, as illustrated in the top section 416 of the figure. A user managing the inking process of the canvas 302 may want to select certain content (e.g., a word "Fijipedia" as illustrated in the figure) for further manipulation. To invoke a Select Command, the user may first draw a circle 415 or other circle-like shapes around the to-be-selected content (i.e., the word "Fijipedia"), as shown in the section 418. Right after the drawing of the circle 415, the user may generate a command trigger, thereby invoking the Select Command. Once the Select Command is invoked, the selected content may become highlighted and become interactive, as shown by the highlighted word "Fijipedia" 417. It is to be noted here that different highlighting styles may be used to highlight the selected words, and the highlighting style for the word "Fijipedia" 417 in FIG. 4D is merely for exemplary purposes.

In some implementations, the selected content may be further dragged to a different location before the pen 401*e* is lifted off the canvas 302. For example, in FIG. 4D, the highlighted word "Fijipedia" 417 may be dragged to a location 419 from its original location, as shown in section 420 in FIG. 4D. In some implementations, the selected content may be further edited through different approaches. For one example, the selected content may be further re-colored. To achieve this, a Menu Command may be further invoked after the current Select Command, as previously described, and the desired color may be selected from a popped-up menu caused by the Menu Command.

Figure 4E:
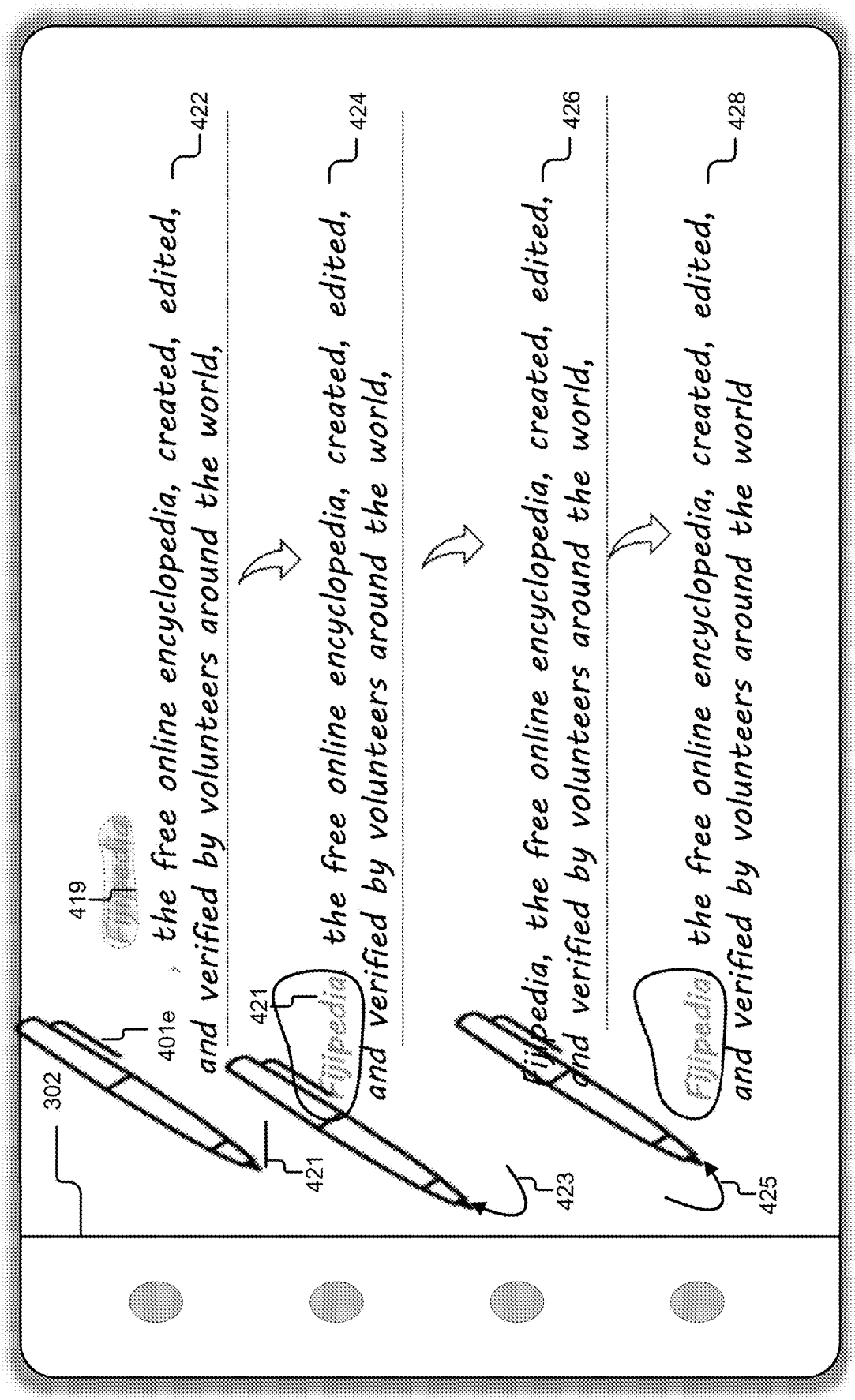
FIG. 4E illustrates an example scenario for invoking an Undo/Redo Command.

FIG. 4E illustrates an example scenario for invoking an Undo/Redo Command. In the top section 422 of the figure, the canvas 302 may include a sentence and a "Fijipedia" having been moved to the location 419 through a Selection Command, as described above in FIG. 4D. In one scenario, the user may want to redo the movement, and want the word "Fijipedia" to be back to its original location. At this point, the user may simply invoke an Undo Command by drawing a line 421 from the right to the left, followed by a command trigger, as shown in section 424. The line may be drawn in the empty place. After the invoking of the Undo Command, the word "Fijipedia" may return to its original location 421, thereby undoing the previous movement, as shown in section 424. It is to be noted that the above is just one example of the Undo Command. In practical applications, the Undo Command may undo many different inking or ink editing processes.

In some implementations, multiple Undo Commands may be sequentially invoked to undo a plurality of processes previously performed. For example, as illustrated in section 426 of FIG. 4E, a second Undo Command may be invoked after the first Undo Command. To invoke the second Undo Command, a user may draw a curve 423 clockwise, and then press and hold. By invoking the second Undo Command, another undo process may be further executed. For example, the word "Fijipedia" previously selected before being moved to the location 419 now becomes unselected, thereby undoing the selection process previously performed before the movement. It can be seen, by invoking multiple Undo Commands, the previously performed processes may be sequentially undone, which may allow the user to make some corrections or change his mind during the inking or ink editing. In some implementations, if there is no process to further undo, the Undo Command may become unresponsive even the Undo Command is invoked.

In some implementations, a Redo Command may be invoked to reverse a process that is previously undone. To invoke a Redo Command, a user may draw a curve 425 anti-clockwise, and then press and hold the pen, as illustrated in the bottom section 428 in FIG. 4E. By invoking the Redo Command, the previously undone selection process in section 426 may be redone, as shown in section 428, in which the word "Fijipedia" is selected again. Similar to the Undo Command, the Redo Command may be performed multiple times by repeating the anti-clockwise drawing followed by pressing and holding a pen. In some implementations, if there is no previously undone process to reverse or redo, the Redo Command may become unresponsive. In some implementations, if there is no previously undone process to reverse or redo, a preceding process may be repeated instead. For example, if there is a word in a line that is just removed (e.g., through a Remove Command), by invoking a Redo Command, a next word following the just removed word may be further removed through the Redo Command. It can be seen that, by using the Undo&Redo Command, a user may easily reverse certain process(es) during an inking process.

Figure 4F:
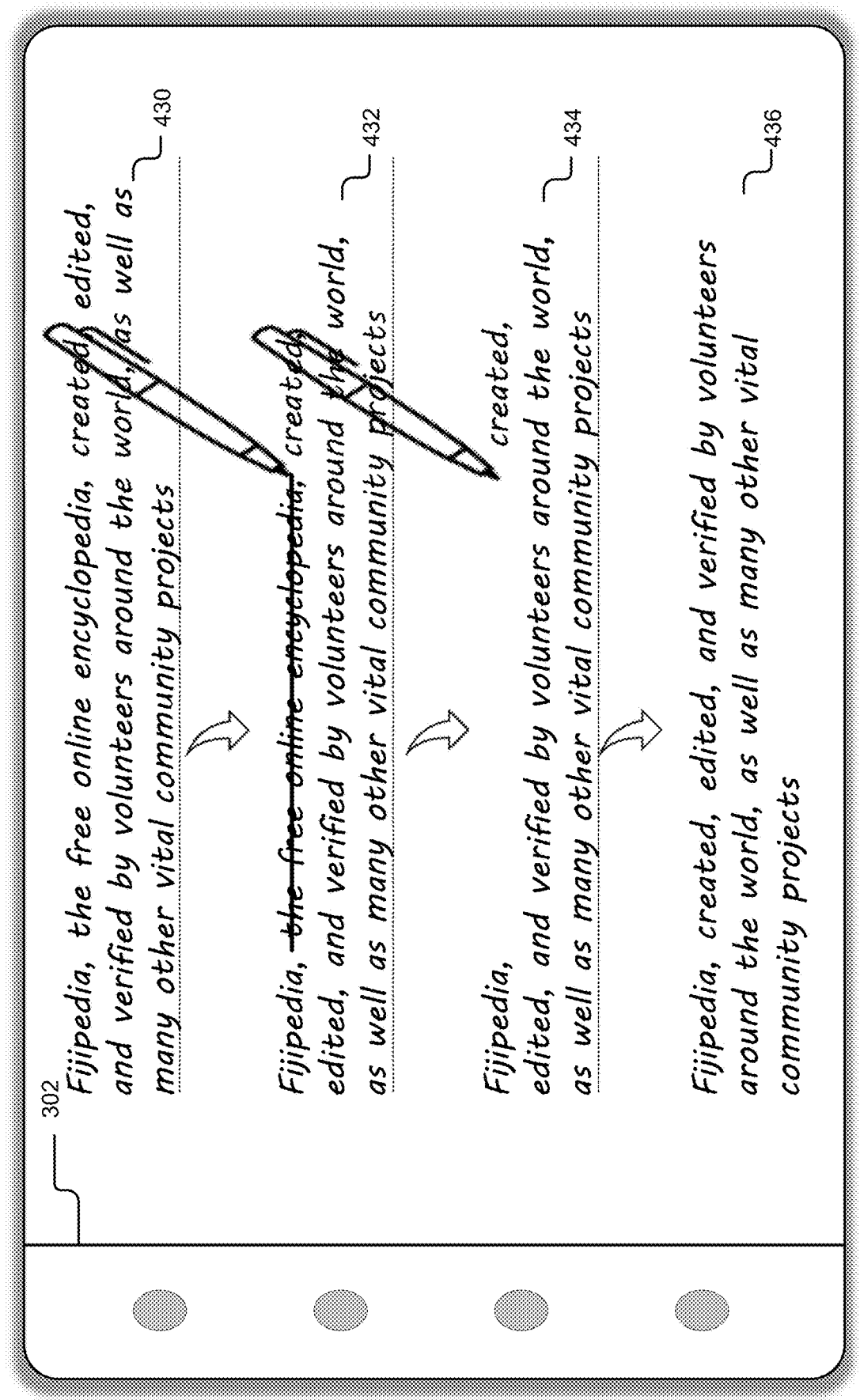
FIG. 4F illustrates an example scenario for invoking a Remove Command.

FIG. 4F illustrates an example scenario for invoking a Remove Command. In the figure, a canvas 302 may originally include one sentence, as illustrated in the top section 430 of the figure. A user managing the inking process of the canvas 302 may want to remove certain words, e.g., "the free online encyclopedia" and the following comma in the sentence. To achieve this, the user may invoke a Remove Command by first crossing these words and the following comma included for removal, as shown in section 432 in FIG. 4F. Following the crossing, the user may press and hold the pen to invoke the Remove Command. Once the Remove Command is invoked, the crossed words and the comma are automatically removed, as shown in section 434. In some implementations, the gap caused by the removal of these words and the comma may be further filled by invoking a Space Command, as shown in section 436 in FIG. 4F (the exact Space Command processing is not illustrated in the figure).

Figure 4G:
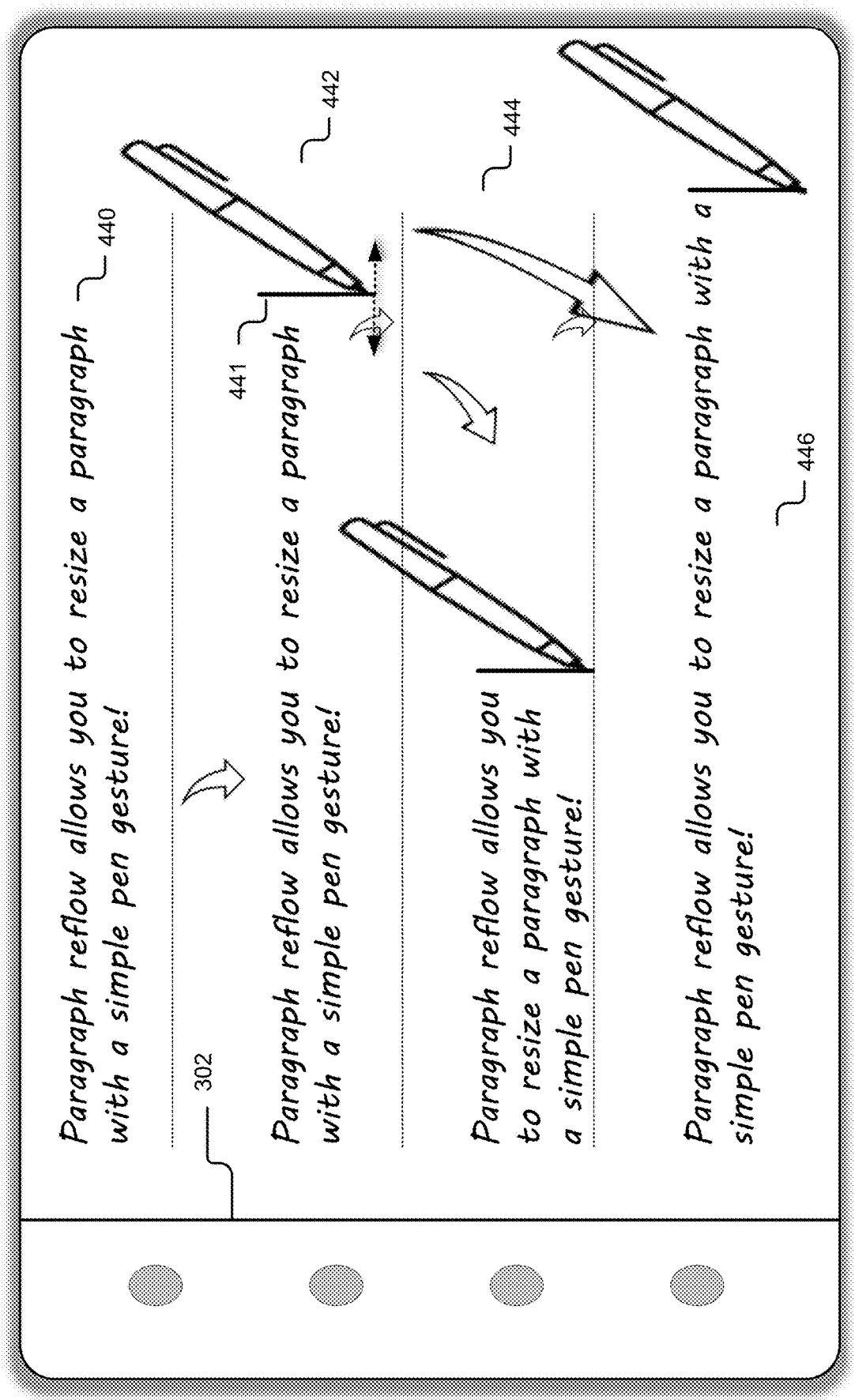
FIG. 4G illustrates an example scenario for invoking a Reflow Command.

FIG. 4G illustrates an example scenario for invoking a Reflow Command. In the figure, a canvas 302 may originally include one sentence, as illustrated in the top section 440 of the figure. A user managing the inking process of the canvas 302 may want to adjust the layout of the canvas 302. For example, the user may want to move the sentence to the left so that he will have space in the right for him to add certain content (e.g., insert a picture on the right). To move the whole sentence further to the left, the words in the sentence needs to reflow since the sentence is already in the leftmost. To achieve this, a Reflow Command may be invoked. In this scenario, the user may draw a vertical line 441 on the right side of the whole sentence (covering two lines). The user may then press and hold the pen to invoke the Reflow Command, as shown in section 442. Once the Reflow Command is invoked, the user may drag the pen to the left. During the movement of the line 441, the words in the sentence will reflow, as shown in section 444 in FIG. 4G. In some implementations, the user may instead want the whole sentence to expand a little to the right. The user may then drag the vertical line 441 to the right side, which will also cause the words in the sentence to reflow and the whole sentence to expand, as shown in section 446 in FIG. 4G.

Figure 4H:
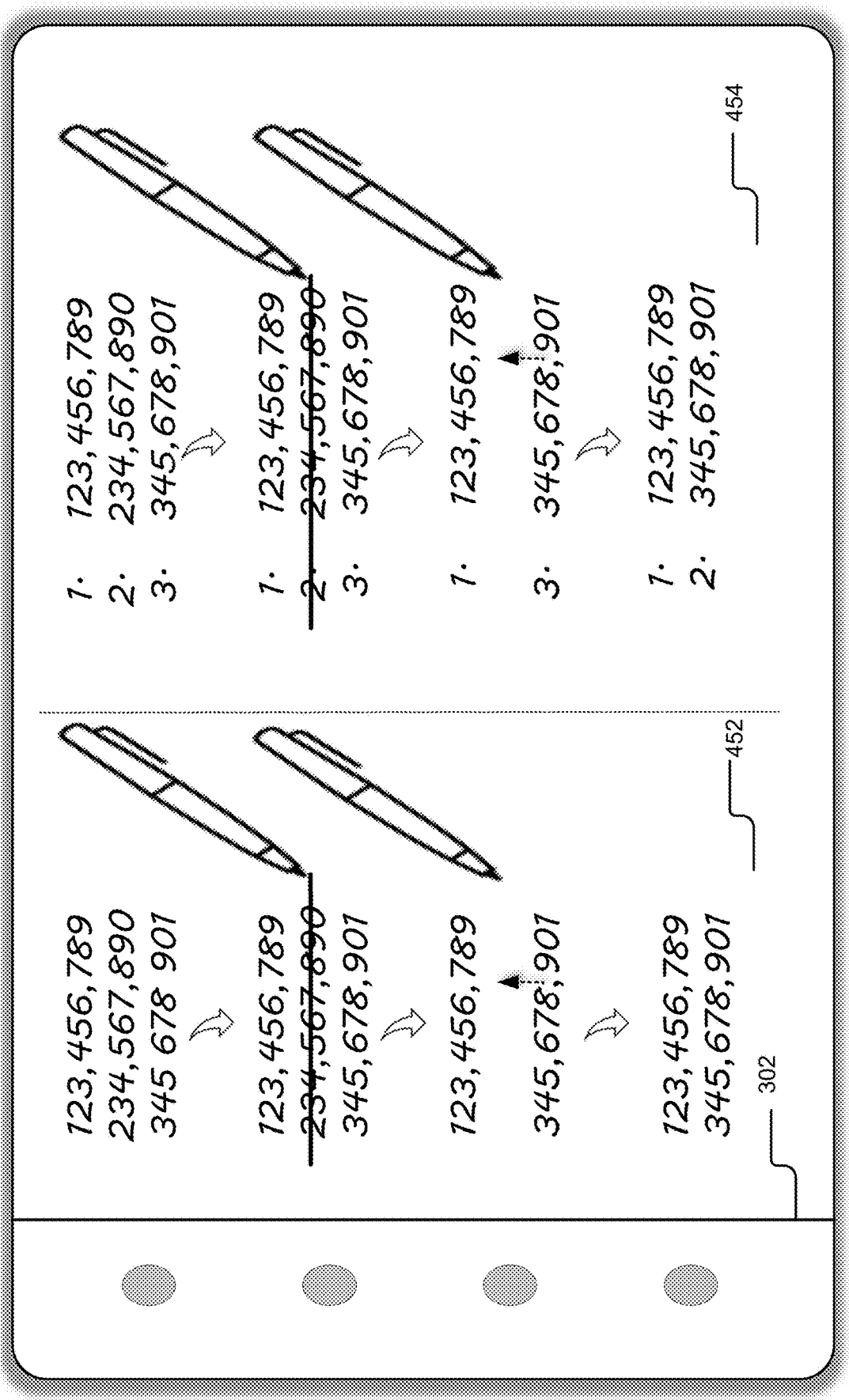
FIG. 4H illustrates example scenarios for text reflow without a specific Reflow Command.

In some implementations, text reflow may not necessarily need a specific Reflow Command, but rather works well when other pen commands described above are performed. FIG. 4H illustrates example scenarios for text reflow without a specific Reflow Command. In the left section 452, a list of three numbers originally exist. Through a Remove Command, the second number may be removed. Without further action, the text reflow may automatically occur, to allow the third number to move up to fill in the gap caused by the removal of the second number in the list. In the right section 454, when the three numbers are numbered, the removal of the second number not only causes the move-up of the third number, but also the moved-up number is renumbered. That is, the number "345,678,901" that originally numbered as "3" now is numbered as "2", to indicate that the number is now the second number in the list. Other example scenarios for text reflow without requiring a Reflow Command may also exist. For example, when a user wants to add a word to a sentence, when the word is selected through a Select Command, the existing words in the sentence may automatically create a space for the word to be added into the sentence.

It is to be noted that the above example scenarios are merely for illustrative purposes. The present disclosure is not limited to the above example scenarios, and many other application scenarios and other types of pen commands are also possible.

Figure 5:
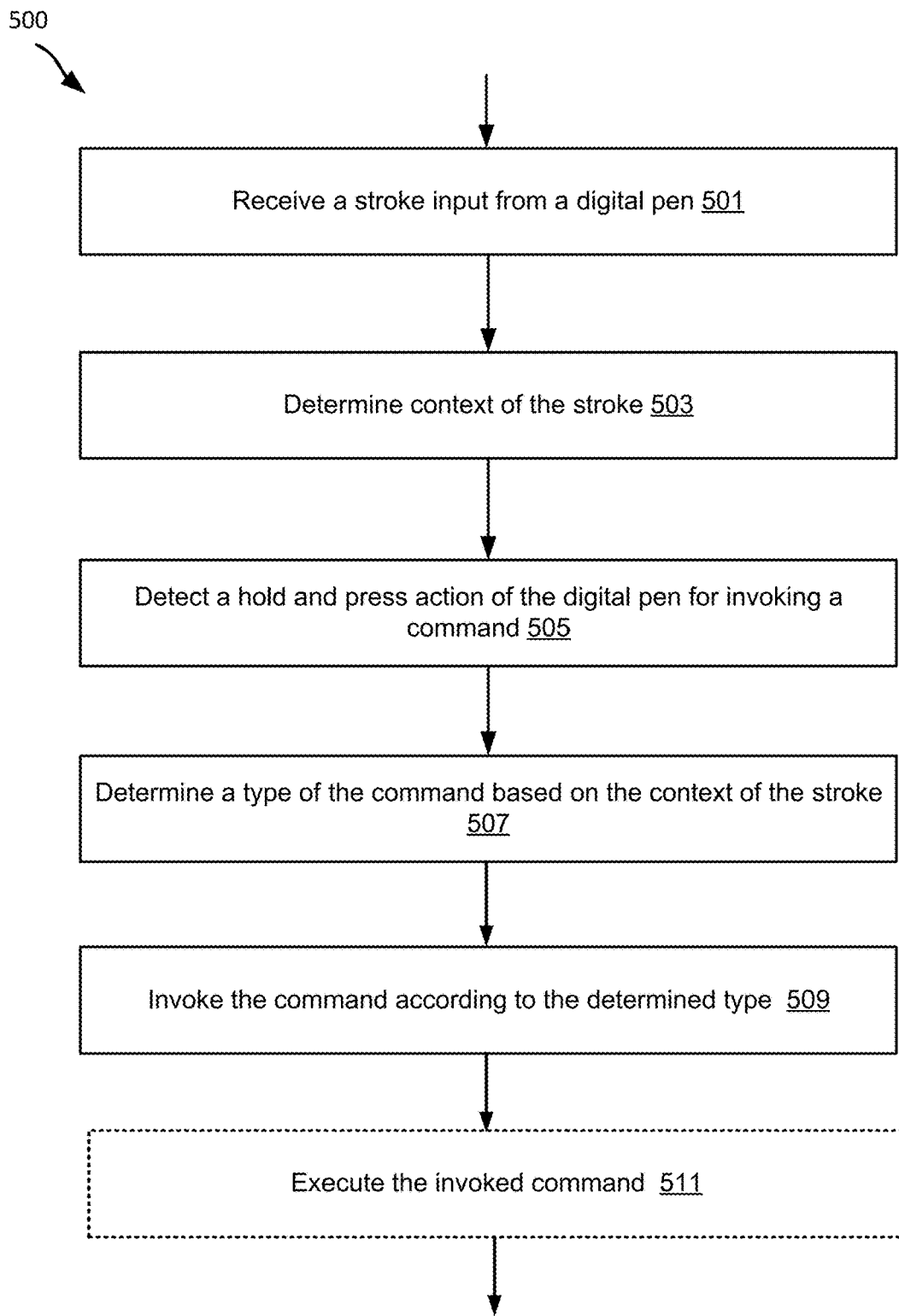
FIG. 5 is a flow chart of an example method for invoking and executing a pen command.

FIG. 5 is a flow chart of an exemplary method 500 for invoking and executing a pen command. In step 501, a stroke input is received from a digital pen. The stroke may be performed by a user on a canvas. The canvas may include existing ink of the digital content that is available for editing. In step 503, the context of the stroke is determined. The context of the stroke may include the location and shape of the stroke. The location information may indicate where the stroke is performed on the canvas. For example, the location information may indicate that the stroke is performed at an empty space with no existing ink, between two words, above a word or a few words, on the right of a line or a few lines, and so on. The shape information may indicate that that stroke is a circle, a short vertical line, a long vertical line, a square, a horizontal line, or just a touch of the canvas. In step 505, a command trigger is received for invoking a pen command. The command trigger may be a press and hold of the digital pen on the canvas right after the stroke without lifting the pen between the stroke and the press and hold. To invoke the pen command, at step 507, a command type for the pen command is first determined. The command type may include a Remove Command, a Space Command, a Menu command, a Select Command, an Undo/Redo Command, a Reflow Command, and so on. The command type may be determined according to the context information of the stroke. In step 509, the determined type of pen command may be invoked, to enable the ink editing of the existing ink. In step 511, the invoked pen command may be executed, for example, to add a space by dragging a vertical line, to move the selected word to a new location, etc. In some implementations, once a pen command is invoked, the ink editing is automatically completed without requiring further user input. For example, the crossed words may be automatically removed once a Remove Command is invoked. In some implementations, a series of pen commands may be sequentially invoked and executed, which thus allows a user to easily edit the existing ink or perform a new inking process, without requiring the user to frequently travel to menus or tools at the designated locations as other existing inking applications do. This greatly saves the amount of time of the user in an inking process.

Figure 6:
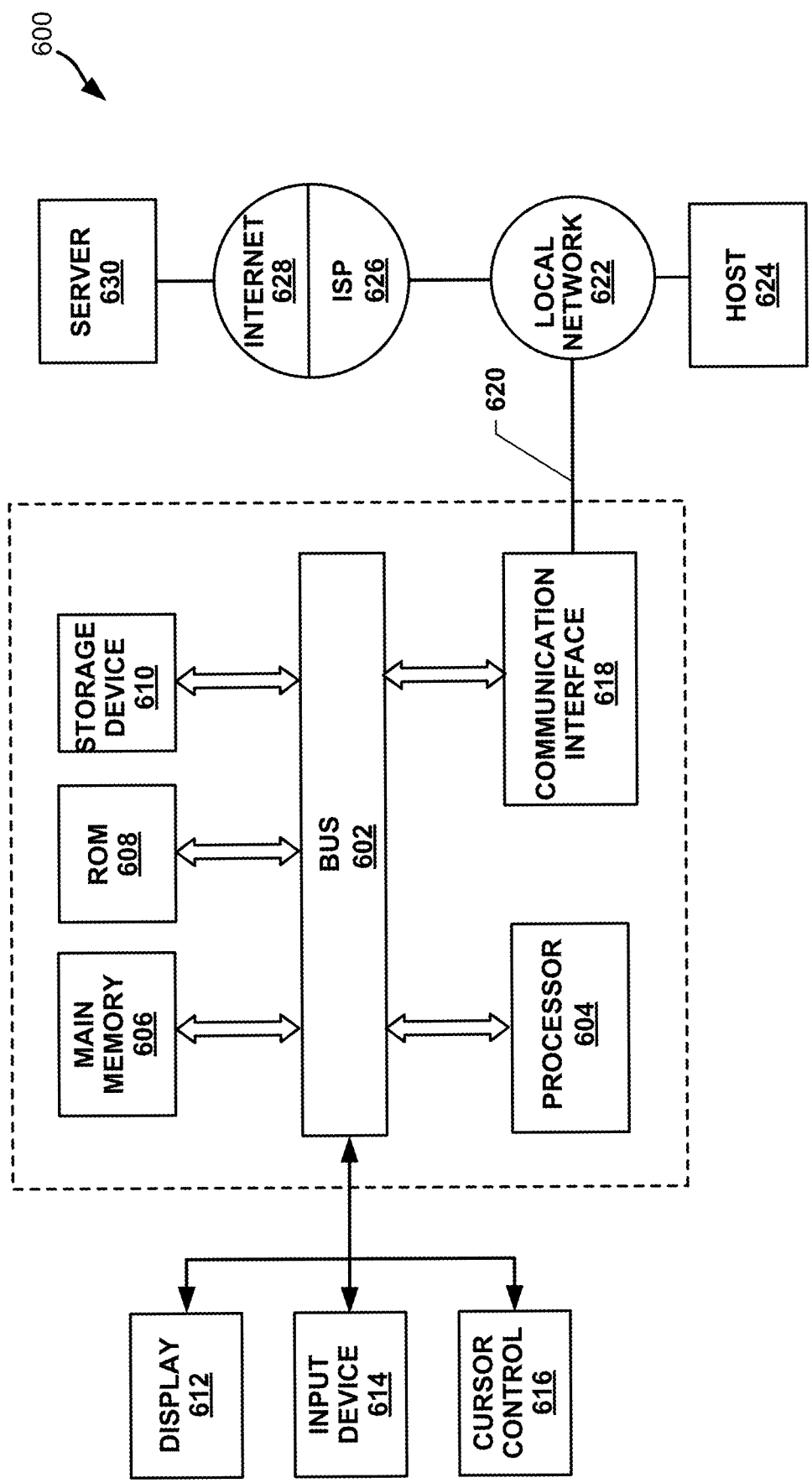
FIG. 6 is a functional block diagram of an example computer system upon which aspects of this disclosure may be implemented.

FIG. 6 is a functional block diagram of an example computer system 600 upon which aspects of this disclosure may be implemented. It will be understood that the logic blocks illustrated in FIG. 6 represent functions, and do not necessarily correspond to particular hardware on a one-to-one basis. The computer system 600 can include a data processor 604, coupled by a bus 602 to an instruction memory or main memory 606, a read-only memory 608, and a storage device 610. The instruction memory 606 can include a tangible medium retrievably storing computer-readable instructions, that when executed by the data processor 604 cause the processor to perform functions, processes, and operations described herein, for example, in reference to FIGS. 1-5.

The computer system 600 can also include a display 612, a user interface or other input device 614, and a cursor control 616, either as separate devices or combined, for example, as a touchscreen display. The computer system 600 can also include a communications interface 618, configured to interface with a local network 622 by a bus 620 for accessing a local host server 624, and to communicate through an ISP 626 to the Internet 628, and access a remote server 630.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for invoking and executing a command using a digital pen, the system comprising:
   a processor; and
   a memory, coupled to the processor, configured to store executable instructions that, when executed by the processor, cause the processor to:
   receive a stroke from the digital pen;
   determine context of the stroke;
   create automatically a threshold of pressure which defines a hold and press action from the digital pen in view of user habits;
   detect an event trigger by comparing pressure information to the threshold of pressure, wherein the event trigger comprises the hold and press action from the digital pen;
   identify a type of the command based on the context of the stroke;
   responsive to detecting the event trigger, invoking, based on the identified type of the command, the command; and
   execute the invoked command.

2. The system of claim 1, wherein, to determine the context of the stroke, the executable instructions further include instructions that, when executed by the processor, cause the processor to:
   determine a position and a shape of the stroke; and
   determine the type of the command is based on the position and the shape of the stroke.

3. The system of claim 1, wherein the determined type of command is a command other than a menu command, and is one of a select command, a remove command, a space command, an undo/redo command, and an ink reflow command.

4. The system of claim 3, wherein the executable instructions further include instructions that, when executed by the processor, cause the processor to:
   determine the context of the stroke by determining that the stroke is a line drawn around a first content at a first position;
   determine the type of the command by determining that the command is the select command;
   invoke the command by invoking the select command; and
   execute the invoked command by selecting the first content.

5. The system of claim 4, wherein, to execute the invoked command, the executable instructions further include instructions that, when executed by the processor, cause the processor to:
   determine whether a drag input is received; and
   move the first content from the first position to a second position responsive to the received drag input being received.

6. The system of claim 3, wherein the executable instructions further include instructions that, when executed by the processor, cause the processor to:
   determine the context of the stroke by determining that the stroke is a line drawn over a second content;
   determine the type of the command by determining that the command is the remove command;
   invoke the command by invoking the remove command; and execute the invoked command by removing the second content.

7. The system of claim 3, wherein the executable instructions further include instructions that, when executed by the processor, cause the processor to:
   determine the context of the stroke by determining that the stroke is a general touch in an empty area;
   determine the type of the command by determining that the command is the menu command;
   invoke the command by invoking the menu command; and
   execute the invoked command by rendering for display a menu, the menu including tools for inking.

8. The system of claim 3, wherein the executable instructions further include instructions that, when executed by the processor, cause the processor to:
   determine the context of the stroke by determining that the stroke is a general touch in an area with existing ink;
   determine the type of the command by determining that the command is the menu command;
   invoke the command by invoking the menu command; and
   execute the invoked command by rendering for display a menu, the menu including tools for editing the existing inking.

9. The system of claim 8, wherein the tools for editing the existing inking are context-dependent.

10. The system of claim 3, wherein the executable instructions further include instructions that, when executed by the processor, cause the processor to:
    determine the context of the stroke by determining that the stroke is a vertical line between a first content and a second content;
    determine the type of the command by determining that the command is a space command;
    invoke the command by invoking the space command; and
    execute the invoked command by adding or removing one or more spaces between the first content and the second content.

11. The system of claim 3, wherein the executable instructions further include instructions that, when executed by the processor, cause the processor to:
    determine the context of the stroke by determining that the stroke is a short right-to-left line;
    determine the type of the command by determining that the command is the undo/redo command;
    invoke the command by invoking the undo/redo command; and
    execute the invoked command by undoing a previous action before the stroke.

12. The system of claim 11, wherein the executable instructions further include instructions that, when executed by the processor, cause the processor to:
    determine whether an additional anti-clockwise draw followed by another press and hold is received; and
    invoking the undo/redo command by redoing a previous inking or ink editing responsive to receiving the additional anti-clockwise draw followed by the another press and hold.

13. The system of claim 3, wherein the executable instructions further include instructions that, when executed by the processor, cause the processor to:
    determine the context of the stroke by determining that the stroke is a vertical line at an end of a third content;
    determine the type of the command by determining that the command is the ink reflow command;
    invoke the command comprises by invoking the vertical line to a command line; and
    execute the invoked command by reorganizing the third content based on a movement of the command line.

14. The system of claim 1, wherein determining context of the stroke is based on a document object model (DOM) and the pressure information is collected from the digital pen.

15. The system of claim 1, wherein the digital pen remains unlifted within a time period between receiving the stroke from the digital pen and executing the invoked command.

16. A method for invoking and executing a command using a digital pen, comprising:
    receiving a stroke from the digital pen;
    determining context of the stroke;
    creating automatically a threshold of pressure which defines a hold and press action from the digital pen in view of user habits;
    detecting an event trigger by comparing pressure information to the threshold of pressure, wherein the event trigger comprises the hold and press action from the digital pen and the pressure information is collected from the digital pen;
    identifying a type of the command based on the context of the stroke;
    responsive to detecting event trigger, invoking, based on the identified type of the command, the command; and
    executing the invoked command.

17. The method of claim 16, further comprising:
    determining a position and a shape of the stroke; and
    determining the type of the command based on the position and the shape of the stroke.

18. The method of claim 16, wherein the determined type of command is a command other than a menu command, and is one of a select command, a remove command, a space command, an undo/redo command, and an ink reflow command.

19. The method of claim 16, wherein the context of the stroke is determined based on a document object model (DOM).

20. The method of claim 16, wherein the digital pen remains unlifted within a time period between receiving the stroke from the digital pen and executing the invoked command, and wherein the command is a command other than a menu command.

* * * * *